US010046446B2

(12) United States Patent

Vandevelde et al.

(10) Patent No.: US 10,046,446 B2

(45) Date of Patent: Aug. 14, 2018

(54) HINGE PIN EXTRACTOR

(71) Applicant: John Vandevelde, Monroe, MI (US)

(72) Inventors: John Vandevelde, Monroe, MI (US); James Worful, Ida, MI (US)

( * ) Notice: Subject to any disclaimer, the term of this patent is extended or adjusted under 35 U.S.C. 154(b) by 15 days.

(21) Appl. No.: 15/200,671

(22) Filed: Jul. 1, 2016

(65) Prior Publication Data

US 2017/0021483 A1 Jan. 26, 2017

Related U.S. Application Data

(60) Provisional application No. 62/196,320, filed on Jul. 24, 2015.

(51) Int. Cl.
*B23P 19/04* (2006.01)
*B25B 27/04* (2006.01)

(52) U.S. Cl.
CPC .................................... *B25B 27/04* (2013.01)

(58) Field of Classification Search
CPC ......... B25B 27/04; E05D 11/00; E05D 3/022; E05D 7/1005
See application file for complete search history.

(56) References Cited

U.S. PATENT DOCUMENTS 6,922,880 B1 * 8/2005 Green ...................... B25B 27/04 29/267
2012/0216380 A1 * 8/2012 Chen ................... B25B 27/0021 29/267
2014/0084022 A1 * 3/2014 Paul ................... B65D 83/0005 222/80

* cited by examiner

*Primary Examiner* — David Bryant
*Assistant Examiner* — Nirvana Deonauth

(57) ABSTRACT

A hinge pin extractor operable to urge a pin out of engagement with a hinge assembly can include a base, a receiver, a plunger, and a lever. The receiver can be mounted to the base and configured to engage a portion of the hinge assembly. The plunger can be mounted to the base and configured to urge a pin of the hinge assembly out of engagement during movement from the first end limit of travel to the second end limit of travel. The lever can be pivotally engaged with the base and disposed to engage the plunger to move the plunger along the rectilinear path. The lever and the base and the plunger can be engaged such that pivoting motion of the lever is transmitted to rectilinear motion of the plunger through at least one fulcrum defined in the base.

20 Claims, 15 Drawing Sheets

HINGE PIN EXTRACTOR

CROSS-REFERENCE TO RELATED APPLICATIONS

This application claims the benefit of U.S. Provisional Patent Application Ser. No. 62/196,320 for a HINGE PIN EXTRACTOR, filed on 24 Jul. 2015, which is hereby incorporated by reference in its entirety.

BACKGROUND

1. Field

The present disclosure relates to a tool for removing the pin of a hinge assembly.

2. Description of Related Prior Art

U.S. Pat. No. 6,922,880 discloses a HINGE PIN-REMOVING TOOL. The hand tool is adapted to remove a hinge pin from a hinge on a door or the like. The hinge pin is pushed out of the hinge by application of force to one end of the hinge pin in a direction that is aligned with the longitudinal axis of the hinge pin. The hand tool includes a main body that is removably attached to the hinge and a hinge pin-engaging unit on the main body. The hinge pin-engaging unit includes a drive pin slidably attached to the main body and a lever arm that is attached to the drive pin at a distal end of the lever arm and is also pivotally attached to the main body by a fulcrum that is attached to the lever arm between the distal end of the lever arm and a proximal end of the lever arm to form a first class lever. A handle is threadably attached to the lever arm adjacent to the proximal end of the lever arm.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A hinge pin extractor operable to urge a pin out of engagement with a hinge assembly can include a base, a receiver, a plunger, and a lever. The receiver can be mounted to the base and can be configured to engage at least one of a first plate, a second plate, and at least one knuckle of the hinge assembly. The plunger can be mounted to the base for movement along a rectilinear path between a first end limit of travel and a second end limit of travel and can be configured to urge the pin of the hinge assembly out of engagement with the at least one of the knuckles during movement from the first end limit of travel to the second end limit of travel. The lever can be pivotally engaged with the base and can be disposed to engage the plunger to transmit motion to the plunger and thereby move the plunger along the rectilinear path. The lever and the base and the plunger can be engaged such that pivoting motion of the lever is transmitted to rectilinear motion of the plunger through at least one fulcrum defined in the base.

BRIEF DESCRIPTION OF THE DRAWINGS

The detailed description set forth below references the following drawings.

DETAILED DESCRIPTION

Figure 1:
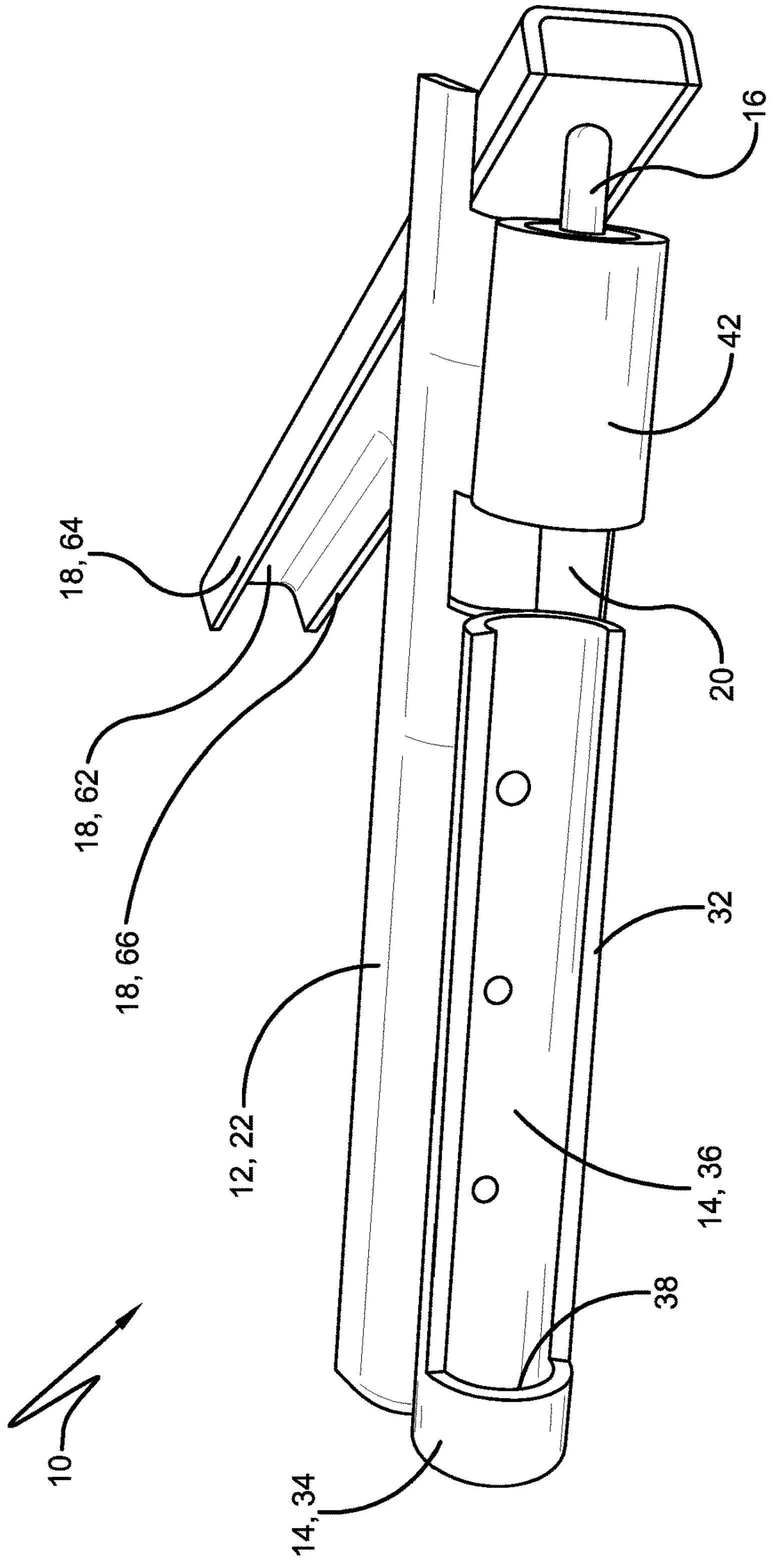
FIG. 1 is a first perspective view of a hinge pin extractor according to an exemplary embodiment of the present disclosure, taken generally from of a front or hinge-facing side of the hinge pin extractor.
Figure 2:
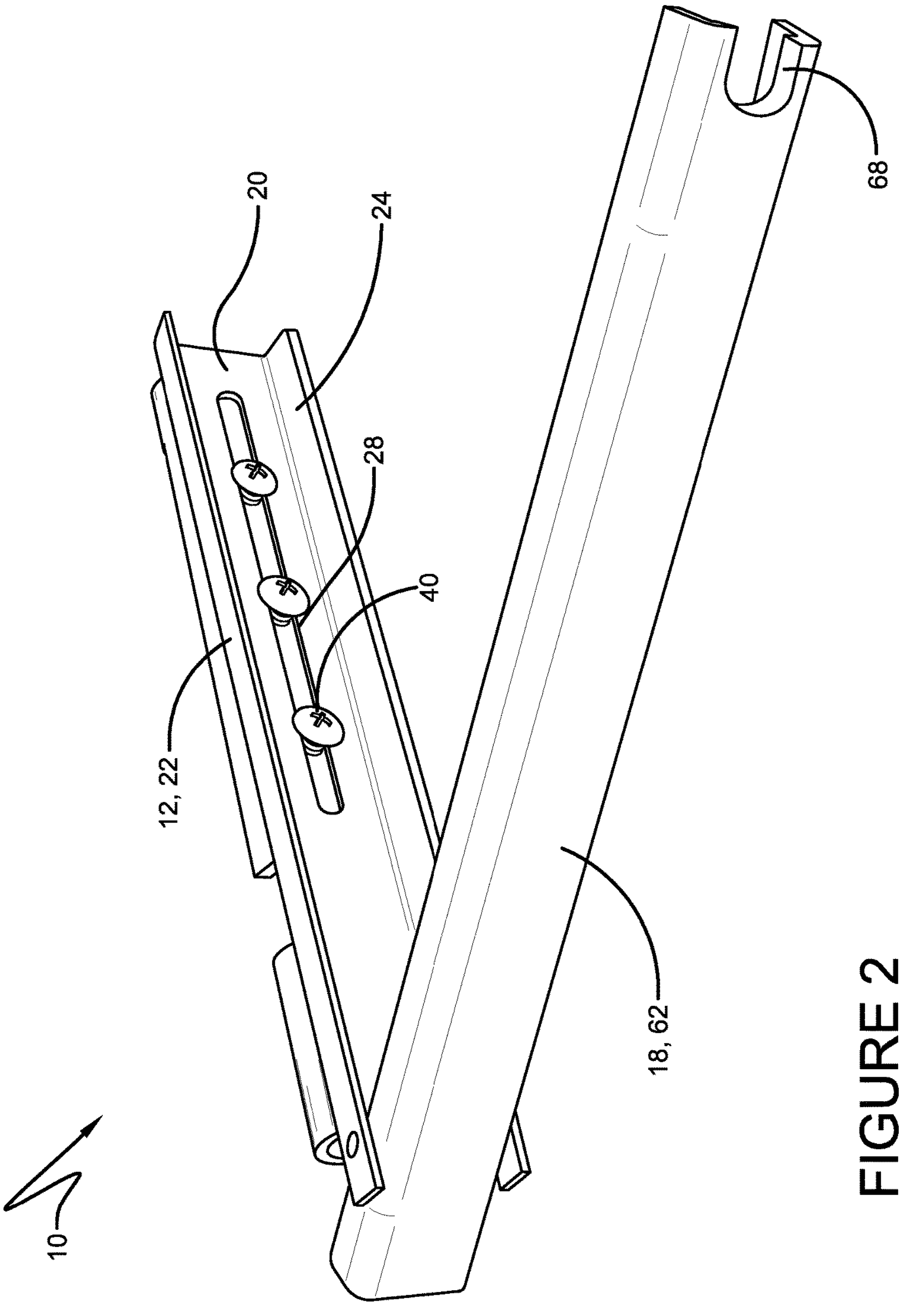
FIG. 2 is a second perspective view of the hinge pin extractor shown in FIG. 1, taken from of a generally rear side of the hinge pin extractor.
Figure 3:
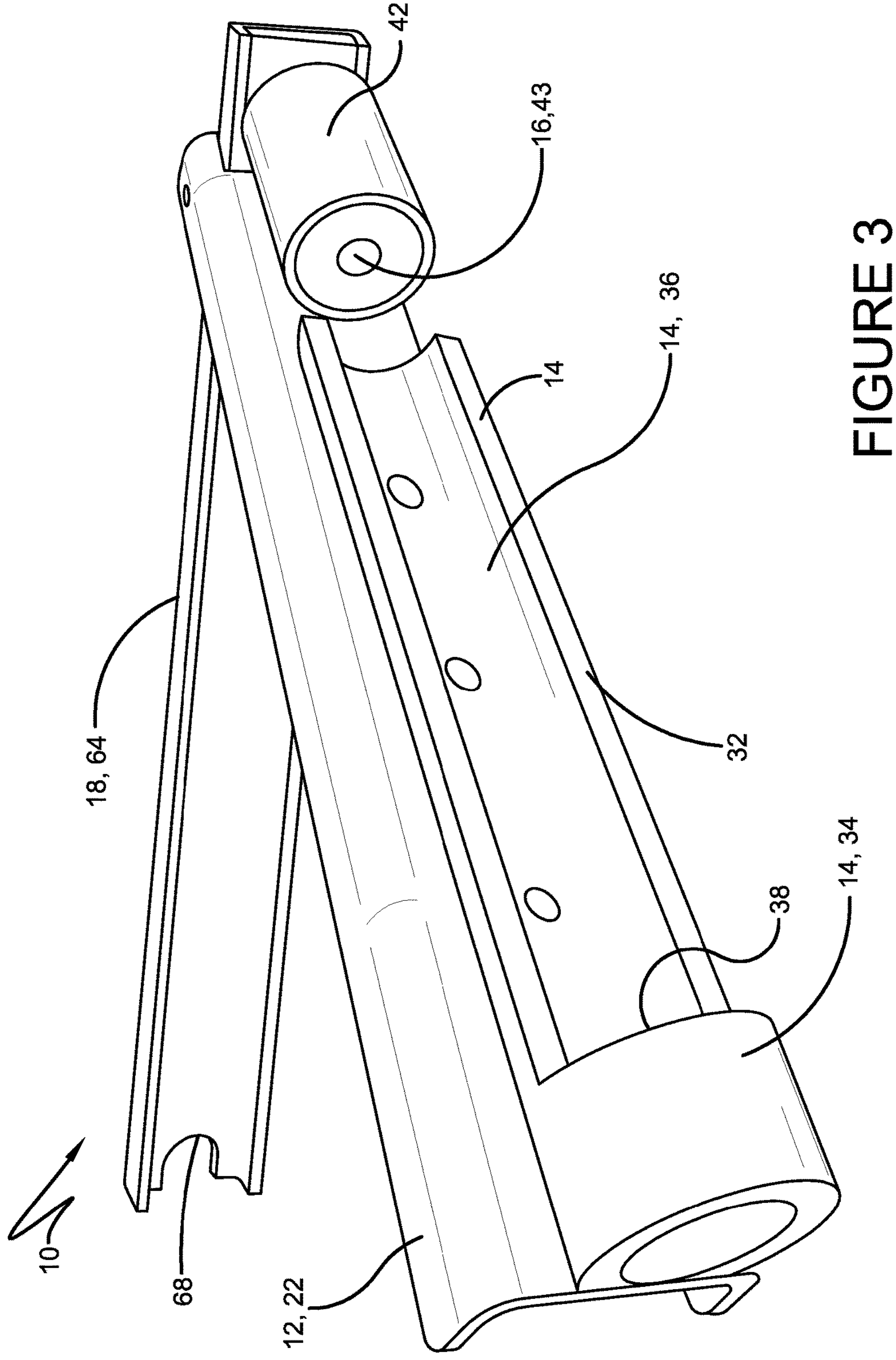
FIG. 3 is a third perspective view of the hinge pin extractor shown in FIGS. 1 and 2, taken from of a generally front side of the hinge pin extractor.

A plurality of different embodiments of the present disclosure is shown in the Figures of the application. Similar features are shown in the various embodiments of the present disclosure. Similar features across different embodiments have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The present disclosure, as demonstrated by the exemplary embodiment described below, can provide a hinge pin extraction tool that provides several significant advantages over the prior art. The exemplary embodiment of the present disclosure can extract hinge pins from various size hinge assemblies. The exemplary embodiment of the present disclosure can also be sized smaller than prior devices because of the arrangement of the fulcrum. A fulcrum is the point on which a lever rests or is supported and on which it pivots. The exemplary embodiment of the present disclosure also defines an integrated tool rather than tool requiring assembly before use. The exemplary embodiment of the present disclosure can also be used on both open and closed doors.

Referring now to the Figures, a hinge pin extractor 10 can be operable to urge a pin 82 out of engagement with a hinge assembly 84 in that the pin 82 can be moved so that a head 102 of the pin 82 becomes spaced from a top-most knuckle 90 of the hinge assembly 84. The hinge assembly 84 can include a first leaf or plate 86 that can define a door-side plate, a second leaf or plate 88 that can define a frame-side plate, and knuckles 90-98 that are each integral with one of the plates 86, 88. The hinge pin extractor 10 can include a base 12, a hinge receiver 14, a plunger 16, and a lever 18.

The base 12 can define a channel profile with a bottom portion 20, a first side portion 22 extending transverse to the bottom portion 20, and a second side portion 24 extending transverse to the bottom portion 20 from a side of the bottom portion 20 opposite the first side portion 22. The first side portion 22 and the second side portion 24 can extend past the bottom portion 20 at one end of the base 12, resulting in a gap referenced at 26 in FIG. 6. The base 12 can also include a slot 28 in the bottom portion 20.

The receiver 14 can be mounted to the base 12 and can be configured to engage at least one portion of the hinge assembly 84. The exemplary hinge receiver 14 is generally cylindrical and hollow. The receiver 14 can be centered on a longitudinal axis 104.

Figure 4:
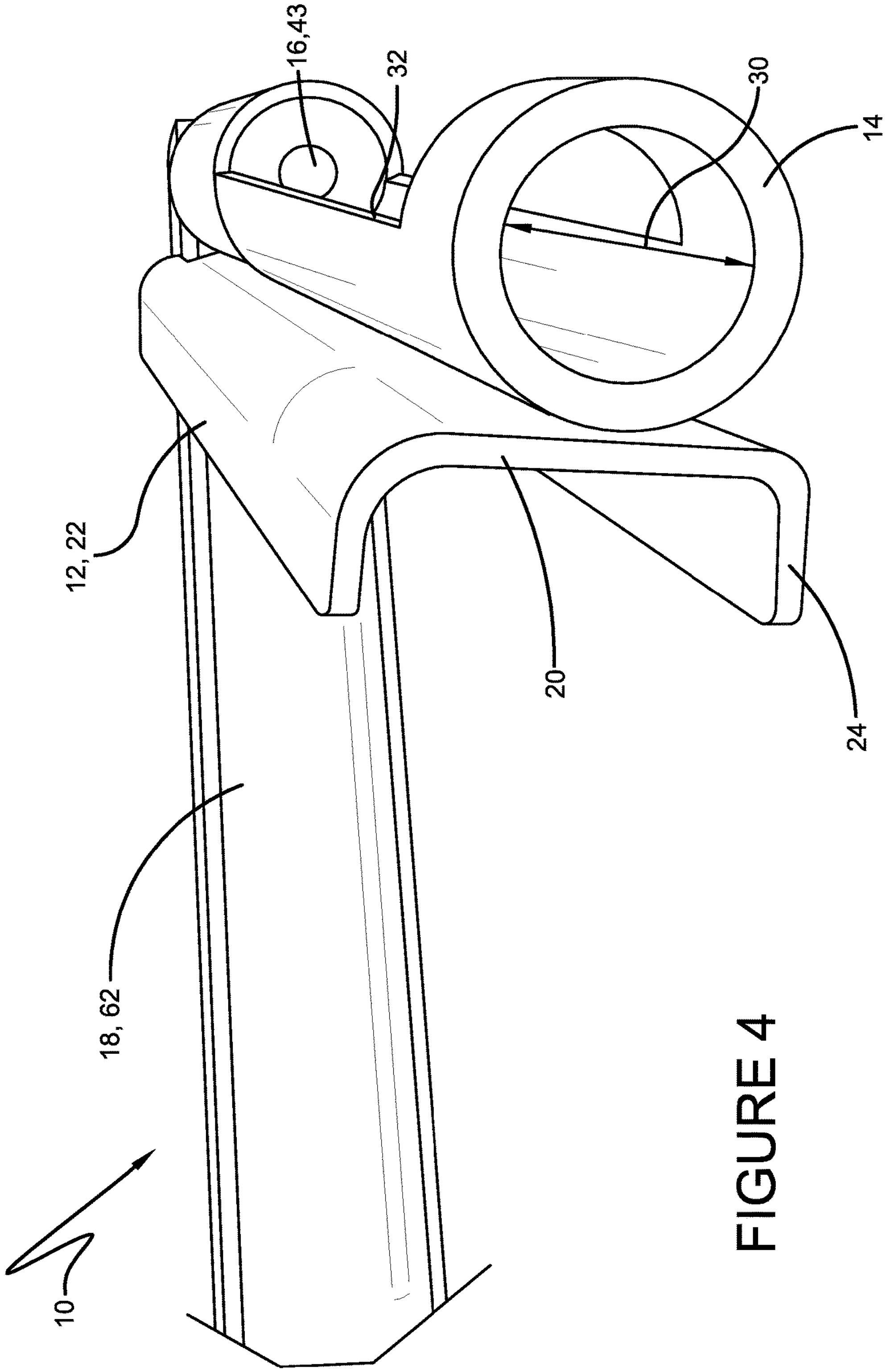
FIG. 4 is a fourth perspective view of the hinge pin extractor shown in FIGS. 1-3, taken from of a generally top side of the hinge pin extractor.
Figure 5:
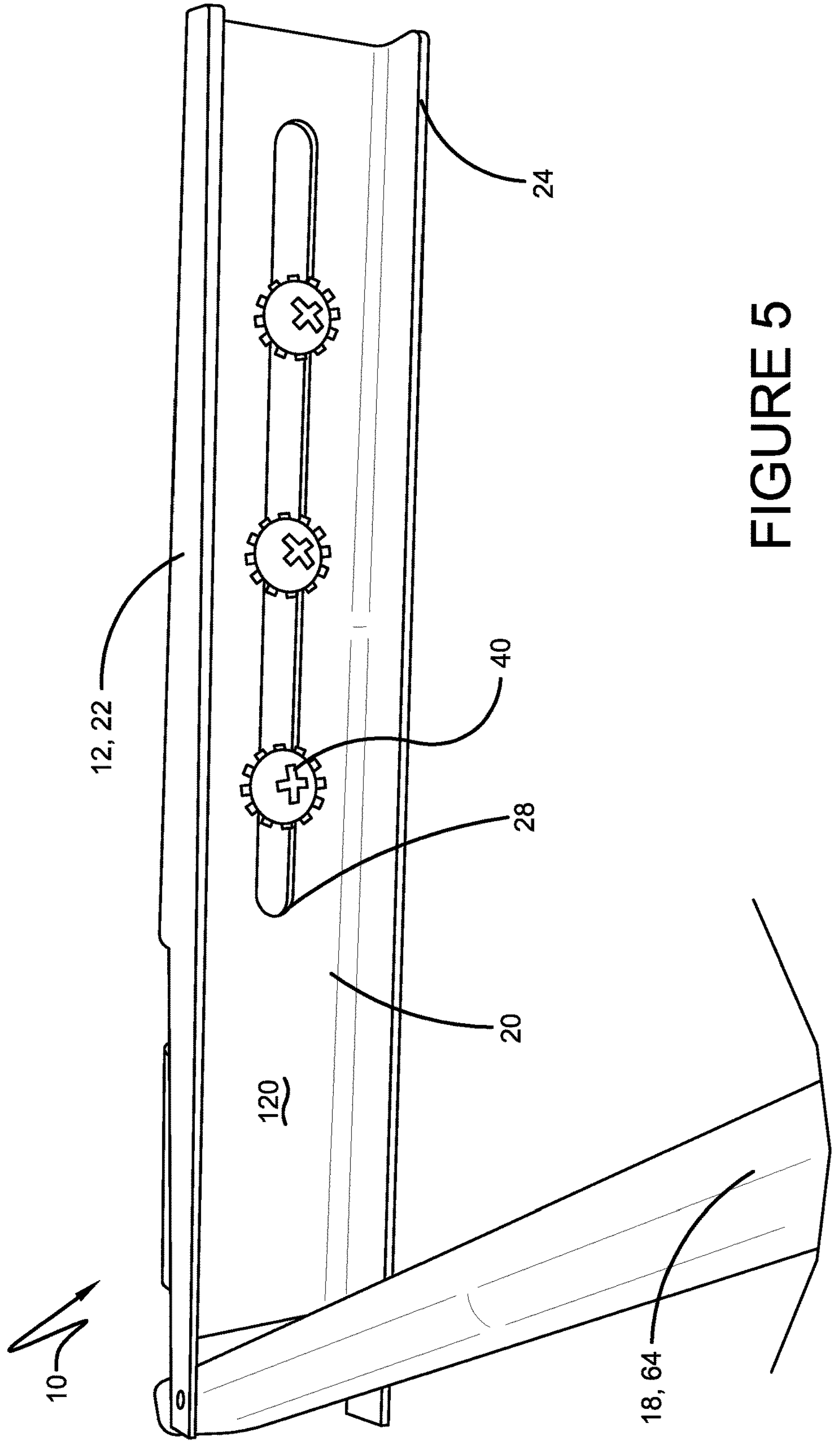
FIG. 5 is a fifth perspective view of the hinge pin extractor shown in FIGS. 1-4, taken from of a generally rear side of the hinge pin extractor.
Figure 10:
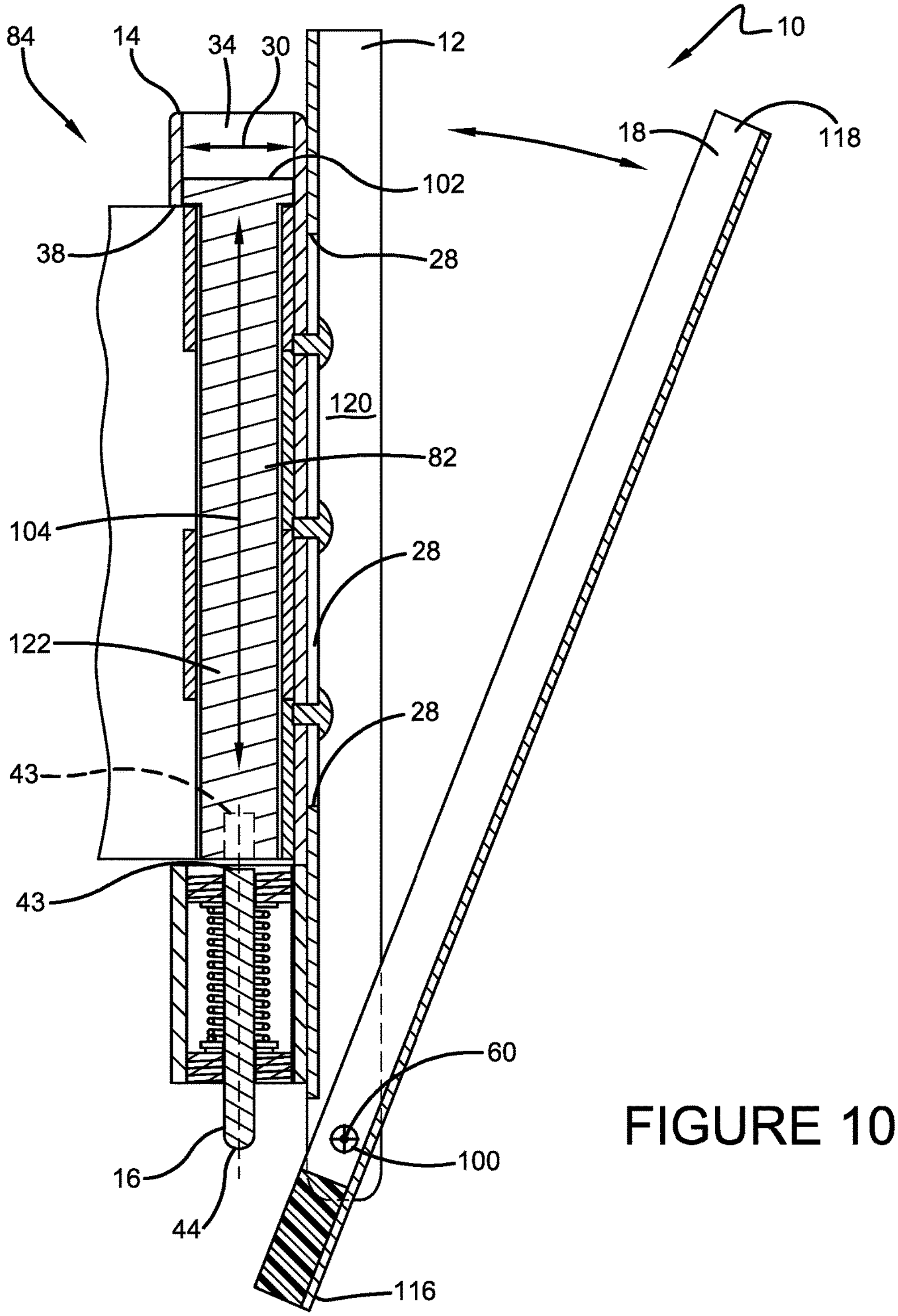
FIG. 10 is a cross-sectional view of the hinge pin extractor shown in FIGS. 1-9 taken in a plane containing a longitudinal axis of the hinge receiver.

The receiver 14 can include a tubular or first portion 34 configured to surround a head of the pin 82, as best shown in FIG. 10. An inner diameter 30 (referenced in FIGS. 4 and 10) of the tubular portion 34 of the hinge receiver 14 can be sized to allow pass-through of the head 102 of the hinge pin 82. This is shown in FIG. 10.

A notch 32 can be defined by or formed in the hinge receiver 14, the notch 32 resulting in a first portion 34 of the hinge receiver 14 being more cylindrical than a second portion 36. The exemplary first portion 34 can be fully cylindrical and the second portion 36 can be less than fully cylindrical. The tubular portion 34 extends a first part of the overall length of the receiver 14 along the longitudinal axis 104 and thus has a ring cross-section in planes perpendicular to the longitudinal axis 104. The exemplary second portion 36 extends a second part of the overall length of the receiver 14 along the longitudinal axis 104 and has a c-shaped cross-section in planes perpendicular to the longitudinal axis 104. The second part of the length can be at least as long as the first part of the length or can be longer than the first part of the length. In the exemplary embodiment, the second part of the length is longer than the first part of the length.

Figure 12:
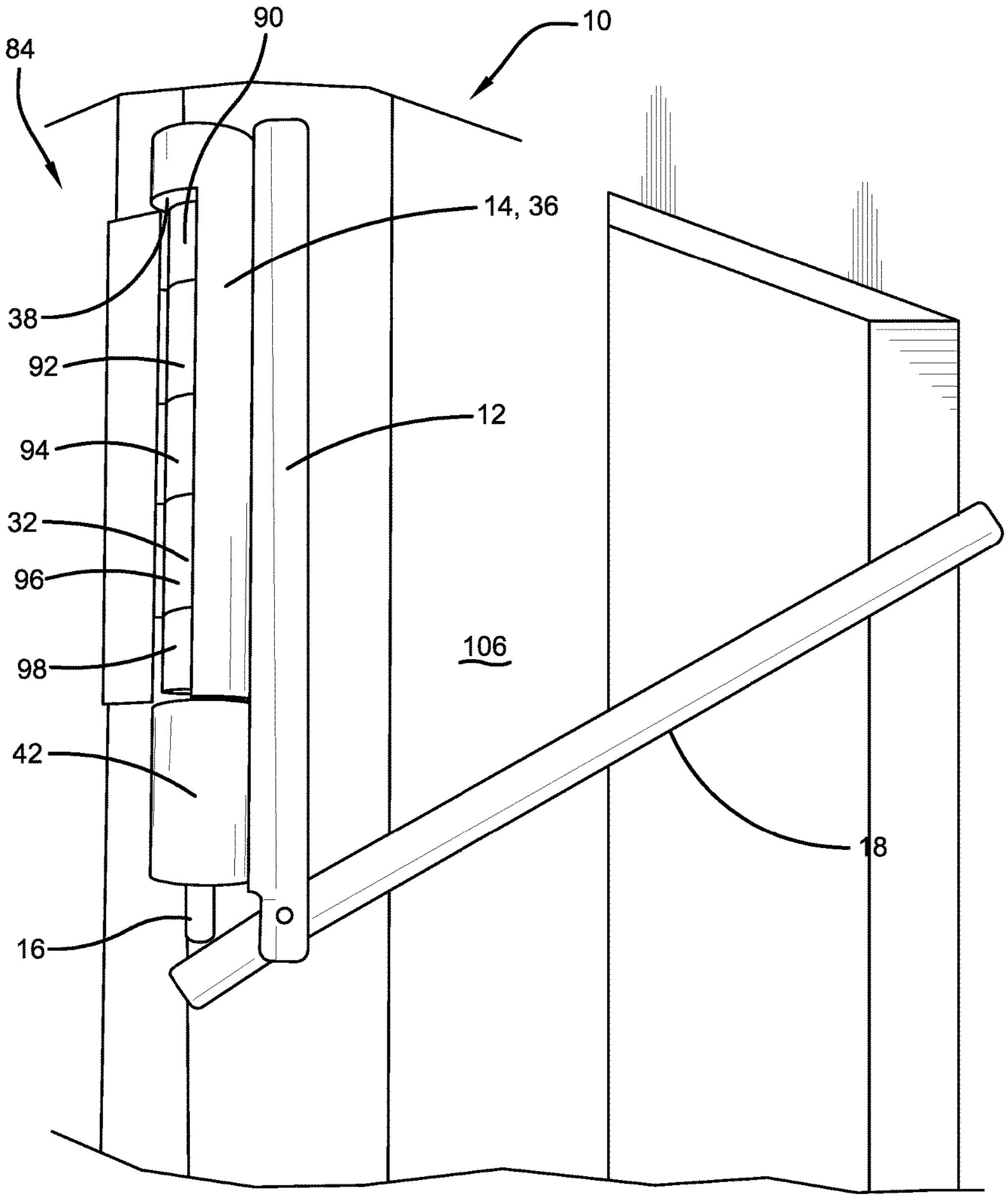
FIG. 12 is a tenth perspective view of the hinge pin extractor shown in FIGS. 1-11, taken from of a generally lateral side of the hinge pin extractor and showing the hinge pin extractor in a working configuration.
Figure 13:
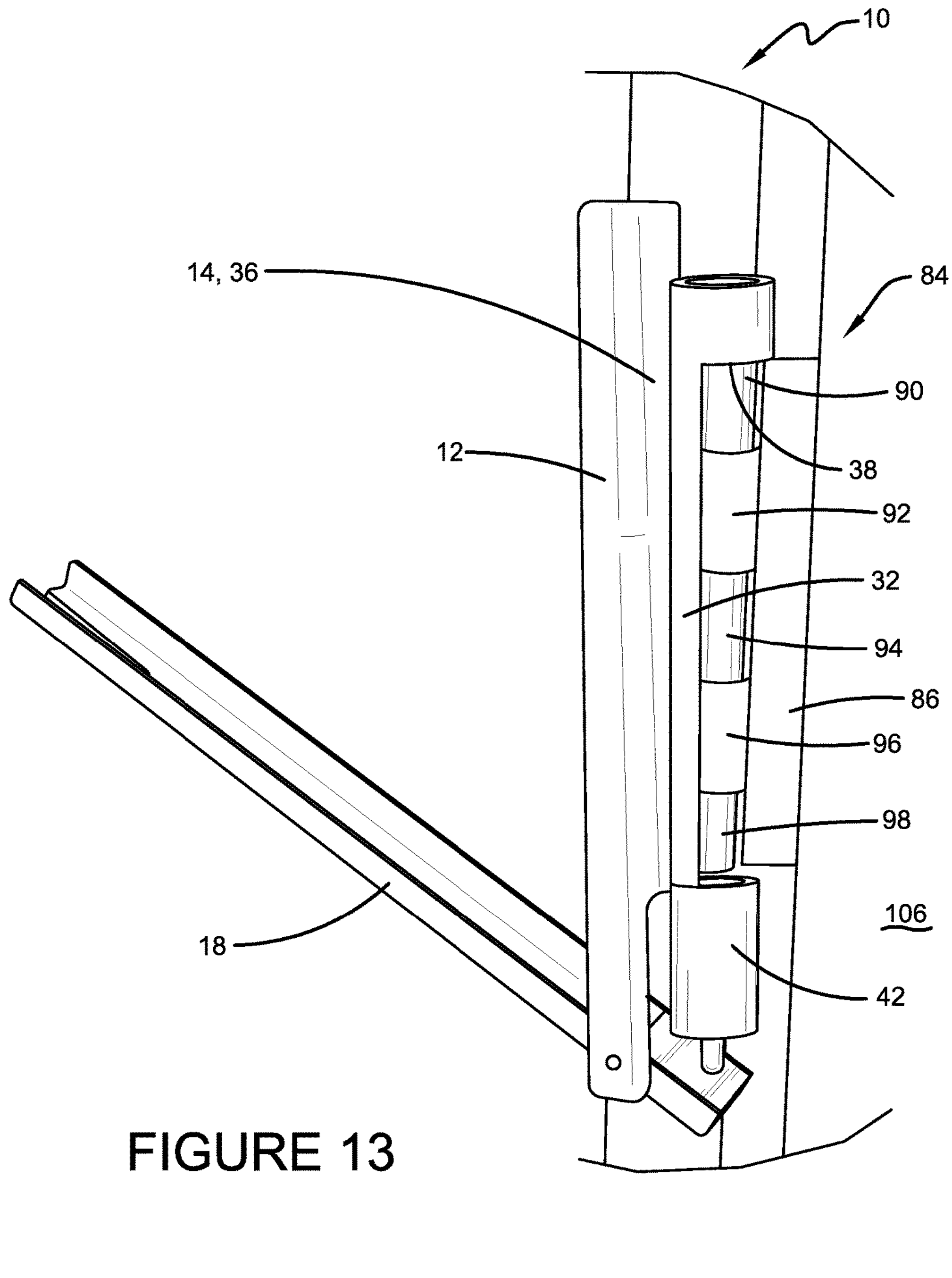
FIG. 13 is an eleventh perspective view of the hinge pin extractor shown in FIGS. 1-12, taken from of a generally lateral side of the hinge pin extractor and showing the hinge pin extractor in a working configuration.

An edge 38 can defined at the junction between the first portion 34 and the second portion 36. The edge 38 can extend one hundred and eighty degrees, less than one hundred and eighty degrees, or more than one hundred and eighty degrees. The exemplary edge 38 extends approximately one hundred and eighty degrees and allows the hinge pin extractor 10 to rest on top surfaces (or "upwardly-facing" surfaces) of the hinge plates 86, 88 of the hinge assembly 84 when a door 106 is open or when the door 106 is closed, as shown in FIGS. 10, 12 and 13. FIG. 12 shows the door 106 partially open and FIG. 13 shows the door 106 closed. The edge 38 is a downwardly-facing surface configured to engage top edges of the first plate 86 and the second plate 88 of the hinge assembly 84. The exemplary edge 38 extends continuously about an arcuate path of at least one hundred and eighty degrees. The exemplary downward surface defined by the edge 38 is without break or an edge resulting from an abrupt change of slope. The exemplary downward surface defined by the edge 38 is continuous and defined in a single plane. The exemplary arcuate path extends about the longitudinal axis 104.

The receiver 14 can be mounted to the base 12 at a midpoint of the c-shaped cross-section of the second portion 36. The second portion 36 can partially surround and "cup" at least one of the knuckles 90-98 when the hinge pin extractor 10 is mounted on the hinge assembly 48 for use. The hinge receiver 14 can engaged with the base 12 such that the position of the hinge receiver 14 along the length of the base 12 is adjustable. The distance between the receiver 14 and the first end limit of travel of the plunger 16 in the exemplary embodiment is therefore adjustable. The hinge pin extractor 10 can thus accommodate hinges of different sizes.

By way of example and not limitation, the hinge receiver 14 can be engaged with the base 12 through fasteners, such as fastener 40, extending through the slot 28. The fasteners can be received in threaded apertures defined in the second portion 36. Locking washers can be disposed between the heads of the fasteners and the bottom portion 20 to prevent slippage. The fasteners 40 can be loosened to allow the exemplary receiver 14 to be positioned in any one of a plurality of different positions along the slot 28. The exemplary receiver 14 is infinitely positionable within the slot 28 between the ends of the slot 28. The fasteners 40 are tightenable and can be tightened to selectively fix the receiver 14 in any one of the plurality of positions.

The plunger 16 mounted to the base 12 for movement along a rectilinear path between a first end limit of travel and a second end limit of travel. The exemplary rectilinear movement of the plunger 16 is along the longitudinal axis 104. The plunger 16 can extend between a first end 43 and a second end 44. The plunger 16 can be configured to urge the pin 82 of the hinge assembly 84 out of engagement with the at least one of the knuckles 90-98 during movement from the first end limit of travel to the second end limit of travel. The travel of the plunger 16 may not fully separate the pin 82 from any one of the knuckles 90-98, however length of travel of the plunger 16 can allow the head 102 to move away from the top-most knuckle 90 to create space for insertion of a prying tool into the gap created between the head 102 and the knuckle 90. In FIG. 10, the plunger 16 is shown in solid line in the first end limit of travel. The first end 43 is shown in phantom to indicate its position when the plunger 16 is at the second end limit of travel.

The plunger 16 can be mounted in a plunger sleeve 42. The sleeve 42 can be mounted to the base 12 and extend between a first end 108 and a second end 110. The exemplary plunger sleeve 42 can be fixedly engaged with the base 12. By way of example and not limitation, the plunger sleeve 42 can be fixedly engaged with the base 12 by welding as done in the exemplary embodiment.

Figure 6:
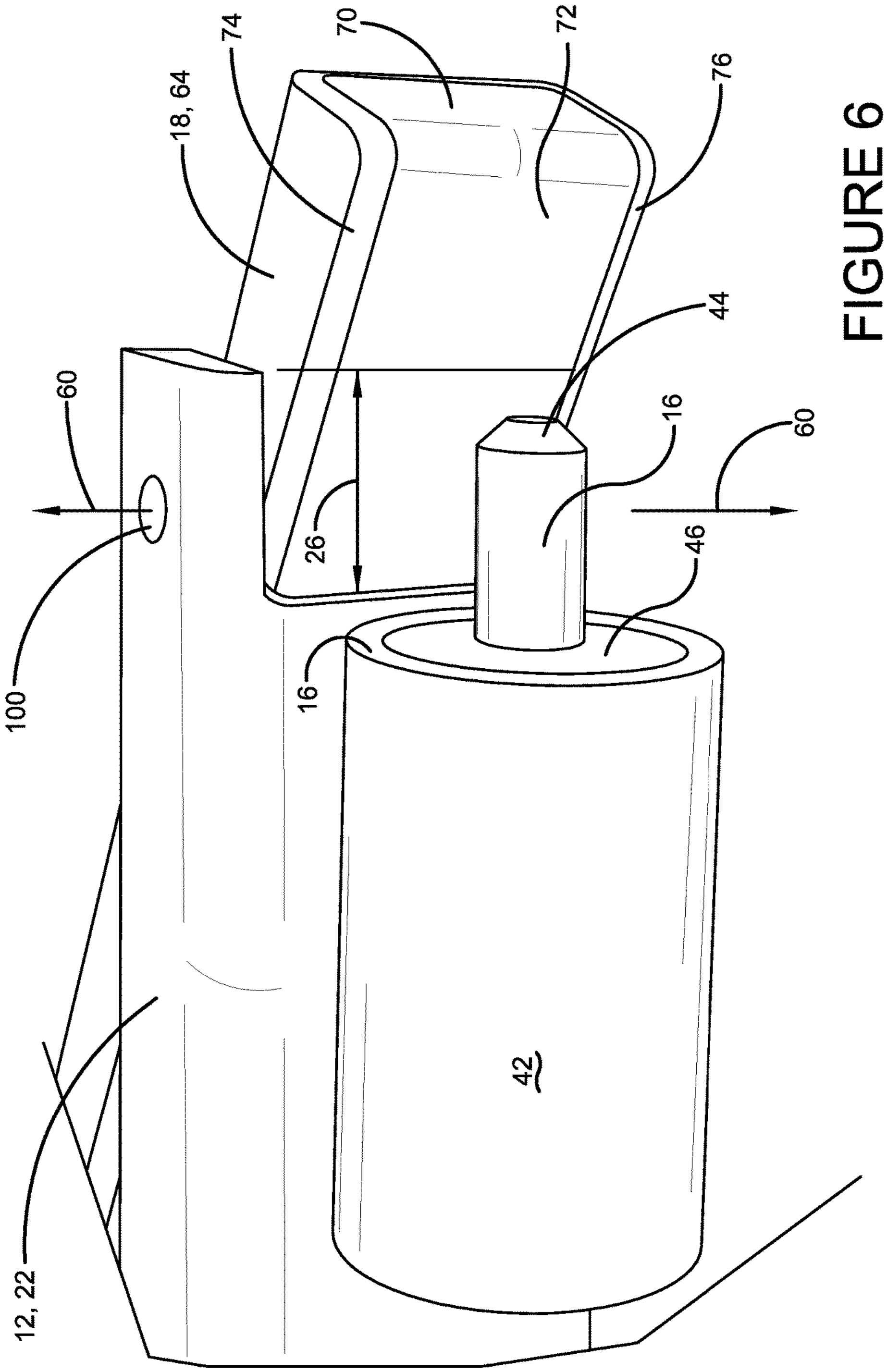
FIG. 6 is a sixth perspective view of a portion of the hinge pin extractor shown in FIGS. 1-5, taken from of a generally front side of the hinge pin extractor and focused on a plunger assembly of the hinge pin extractor.

The plunger 16 can be moveably associated with the base 12 to travel along a rectilinear path between first and second end limits of travel. A rectilinear path is a path without curvature. The plunger 16 can move along a rectilinear path that is collinear with its longitudinal axis. The rectilinear path can also be collinear with the longitudinal axis of a hinge pin being extracted. An end limit of travel can be defined by any point along the length of the plunger 16. For example, the second end 44 of the plunger 16 is shown in FIG. 6 at the first end limit of travel. A second end limit of travel of the plunger 16 can be defined when the end 44 is flush with a cap 46 enclosing one end of the plunger sleeve 42. As will be discussed below, this can occur when the lever 18 is fully pivoted relative to the base 12.

Figure 11:
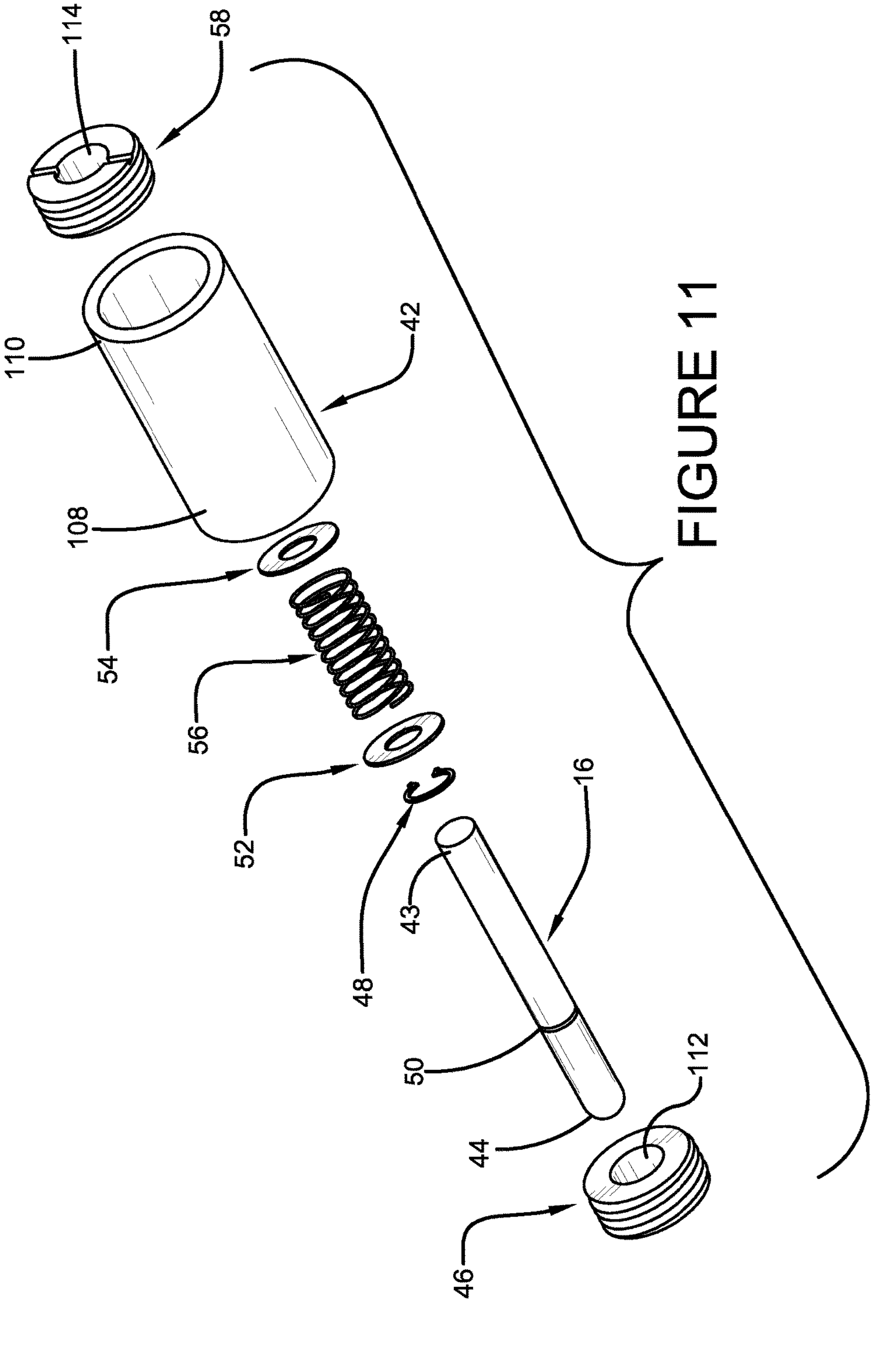
FIG. 11 is an exploded view of the plunger assembly of the hinge pin extractor shown in FIGS. 1-10.

FIGS. 10 and 11 illustrate components internal of the plunger sleeve 42. A c-clip 48 can be mounted in a groove 50 of the plunger 16. The c-clip 48 can define a shoulder fixedly engaged with the plunger 16 and positioned in the sleeve 42. In various embodiments of the present disclosure, a shoulder can be integrally-formed on plunger 16 or can be a separate structure mounted on the plunger 16, such as c-clip 48. Washers 52, 54 can define seats for a spring 56. The exemplary spring 56 is operably positioned between the c-clip 48 and the end cap 58 within the sleeve 42. The spring 56 in cooperation with the washers 52, 54 and c-clip 48 can bias the plunger 16 to the first end limit of travel. The c-clip 48 can prevent the plunger 16 from exiting the plunger sleeve 42 through the cap 46.

The components internal of the plunger sleeve 42 can be enclosed with the cap 46 and a cap 58. The first end cap 46 can have a first aperture 112 and substantially close the first end 108 of the sleeve 42. The second end cap 58 can have a second aperture 114 and substantially close the second end 110 of the sleeve 42. The exemplary plunger 16 is disposed in the sleeve 42 and is sized to pass through both of the first aperture 112 and the second aperture 114. The first and second ends 43, 44 of the plunger 16 can be sized differently or the same. The end 44 can pass through the first aperture 112 and the end 43 can pass through the aperture 114.

The lever 18 extends between a first end 116 proximate to the plunger 16 and a second end 118 spaced from the first end 116 and from the plunger 16. The lever 18 can be pivotally engaged with the base 12 through the fulcrum 100, pivoting about axis 60. The lever 18 can be disposed to engage the plunger 16 to transmit motion to the plunger 16 and thereby move the plunger 16 along the rectilinear path. Movement of the plunger 16 can be accomplished through a single pivot axis, rather than multiple pivot axes.

The exemplary lever 18 and the exemplary base 12 and the exemplary plunger 16 are engaged such that pivoting motion of the lever 18 is transmitted to rectilinear motion of the plunger 16 through the fulcrum 100 defined in the base 12. The fulcrum 100 of the lever 18 is fixedly disposed on the base 12 whereby the hinge pin extractor 10 can also be sized smaller. The exemplary fulcrum 100 is a single fulcrum 100. In the exemplary embodiment, the lever 18 can generate a nine-to-one mechanical advantage. The exemplary axis 60 extends across and overlaps the gap 26.

Figure 7:
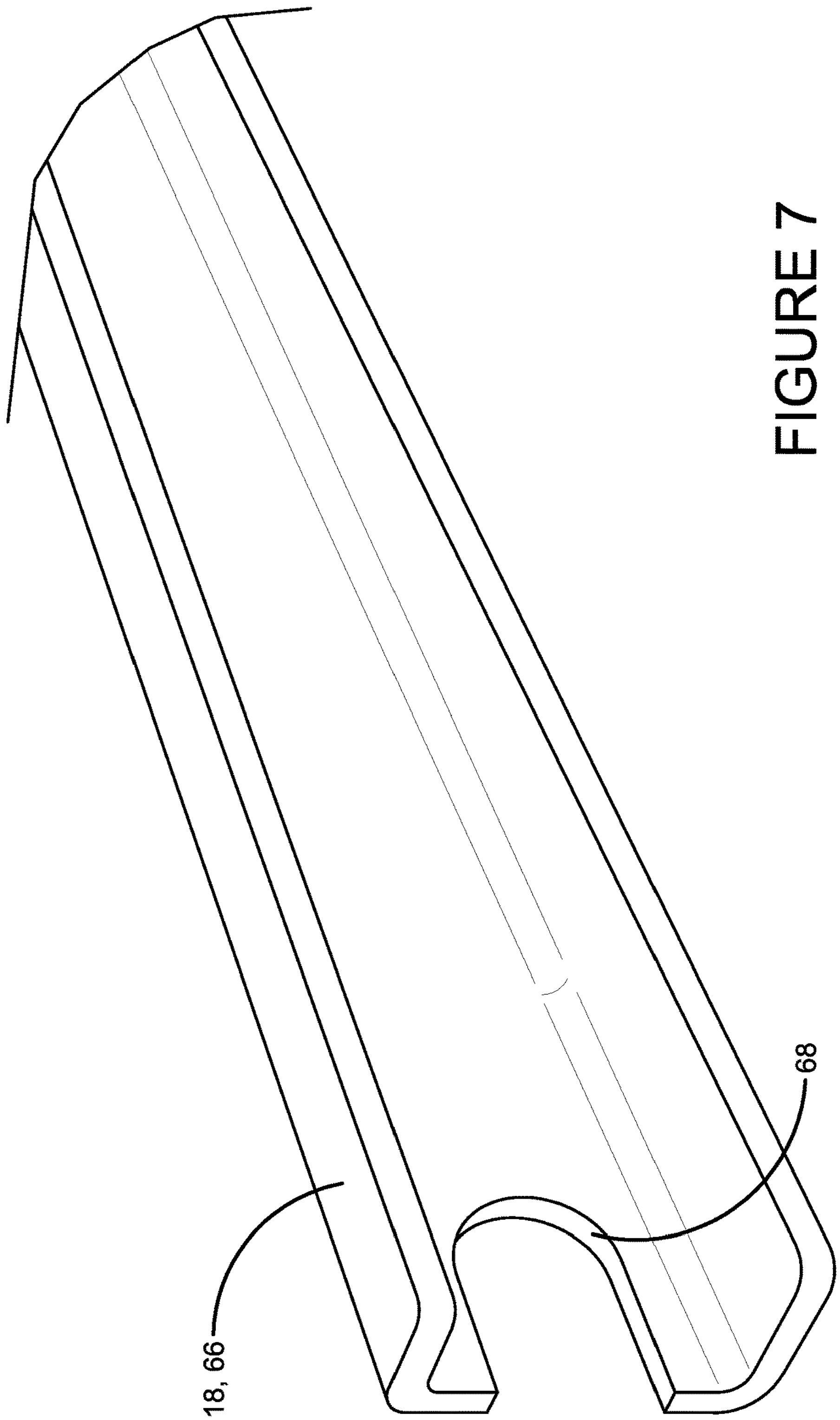
FIG. 7 is a seventh perspective view of a portion of the hinge pin extractor shown in FIGS. 1-6, taken from of a generally top side of the hinge pin extractor and focused on a distal end of a lever of the hinge pin extractor.
Figure 8:
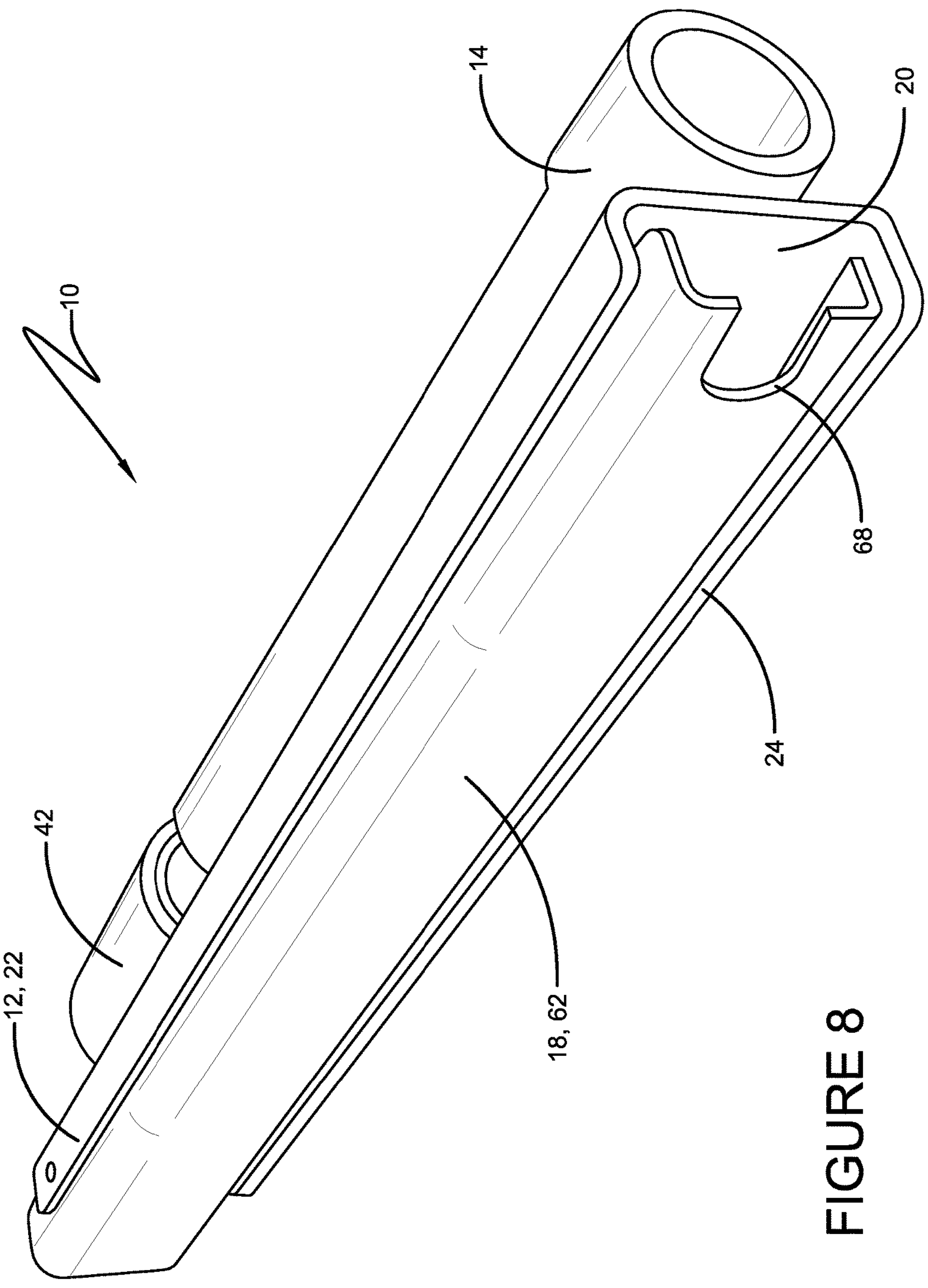
FIG. 8 is a eighth perspective view of the hinge pin extractor shown in FIGS. 1-7, taken from of a generally rear side of the hinge pin extractor and showing the hinge pin extractor in a standby configuration.

The lever 18 can define a channel profile with a bottom portion 62, a first side portion 64 extending transverse to the bottom portion 62, and a second side portion 66 extending transverse to the bottom portion 62 from a side of the bottom portion 62 opposite the first side portion 64. As best show in FIG. 7, a notch 68 can be defined in the lever 18 at the second end 118. After the head 102 of a hinge pin 82 has been forced upwardly away from the knuckle 90 of the hinge assembly 84 by movement of the plunger 16, the notch 68 can be moved to partially surround the shank 122 of the hinge pin 82. The lever 18 can then be moved upward against the head 102 to fully remove the hinge pin 82. The bottom portion 20 and the side portions 22, 24 of the base 12 cooperate to define a recess 120 sized to receive the lever 18 when the lever 18 is not in use. As shown by FIG. 8, the notch 68 is exposed and useable to partially encircle the pin 82 when the lever 18 has been received in the recess 120. Thus, after the head 102 of a hinge pin 82 has been forced upwardly away from the knuckle 90 of the hinge assembly 84 by movement of the plunger 16, the lever 18 can be pivoted back into the recess 120 and the notch 68 can still be moved to partially surround the shank 122 of the hinge pin 82. The entire hinge pin extractor 10 can then be moved upward against the head 102 to fully remove the hinge pin 82.

The lever 18 can include a bushing 70 having a substantially flat, planar shape. The nylon bushing 70 can be positioned in the channel profile of the lever 18. As best shown in FIG. 6, the bushing 70 can be sized such that a top surface 72 of the bushing 70 is flush with top edges 74, 76 of the first and second side portions 64 and 66.

The lever 18 and the plunger 16 engage one another in a cam-cam follower arrangement, rather than being positively interconnected, such as through a pin or fastener. A cam-cam follower arrangement involves one structure pushing another structure to move that structure, while being positively interconnected allows one structure to push and pull another structure. Movement can be forced in two opposite directions when two structures are positively interconnected. The exemplary lever 18 and exemplary plunger 16 can engage one another such that at least a portion of the plunger 16 slides across a portion of the lever 18 during the transmission of motion. When the lever 18 is pivoted relative to the base 12 to move the plunger 16 along the rectilinear path, the lever 18 can pivot until the top edges 74, 76 and top surface 72 abut and contact (or be immediately adjacent to) an edge 78 of the plunger sleeve 42. The end 44 of the plunger 16 can slide along the top surface 72 during pivoting movement of the lever 18 to inhibit and/or eliminate loading and stress on the plunger 16 in a direction transverse to the rectilinear path.

Figure 9:
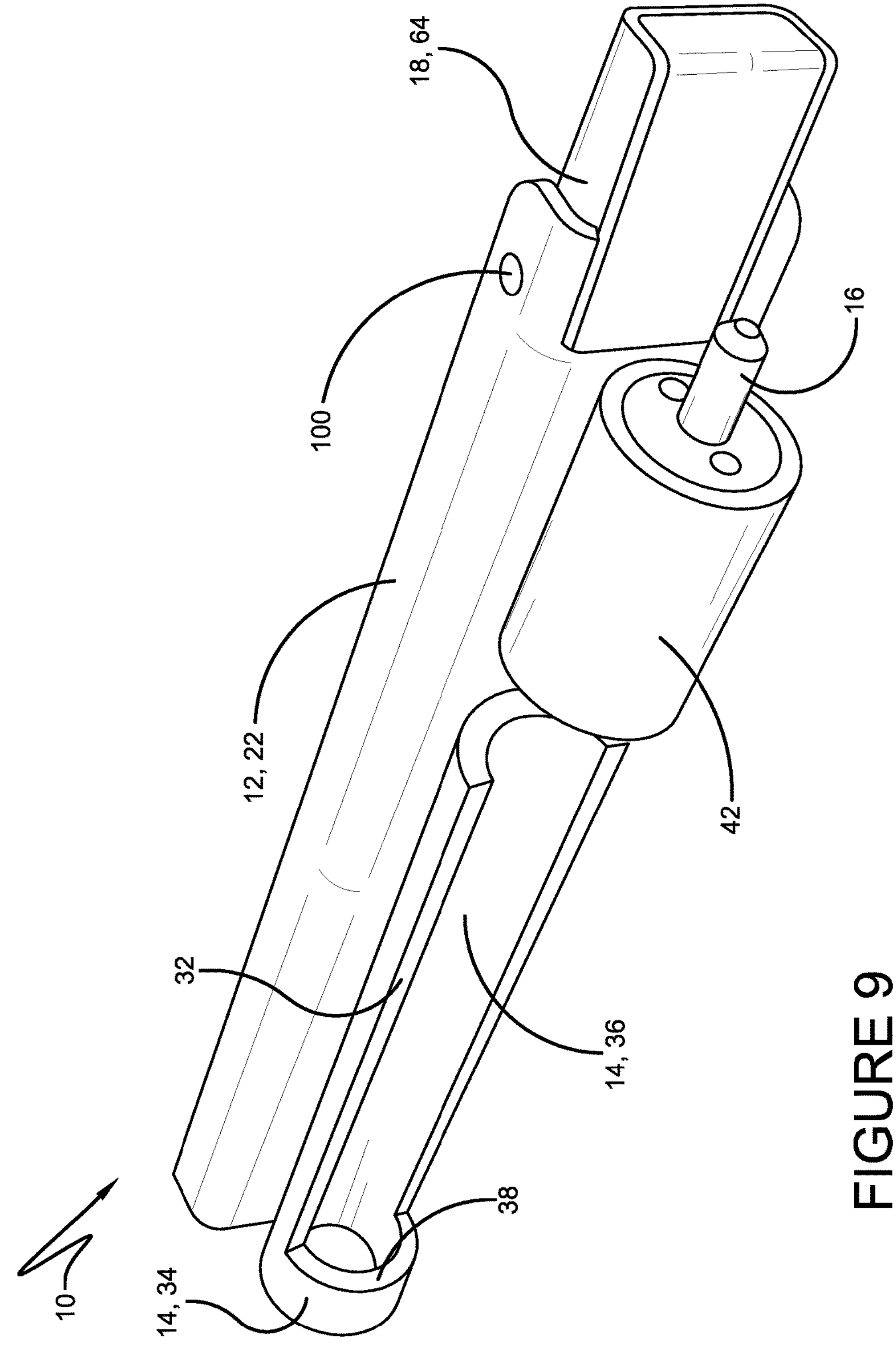
FIG. 9 is a ninth perspective view of the hinge pin extractor shown in FIGS. 1-8, taken from of a generally front side of the hinge pin extractor and showing the hinge pin extractor in a standby configuration.

The exemplary embodiment of the present disclosure defines an integrated tool rather than a tool requiring assembly before use. As shown in FIGS. 8 and 9, when in a standby configuration, the exemplary hinge pin extractor 10 can define a generally cubic structure that can be received in a holder. FIG. 12 shows the hinge pin extractor 10 positioned on the hinge assembly 84 in a working configuration. It is noted that the hinge pin extractor 10 will be adjusted by shifting the receiver 14 relative to the base 12 so that the plunger sleeve 42 abuts and contacts (or is proximate to) the lowest knuckle 98 of the hinge assembly 84. FIG. 13 illustrates the hinge pin extractor 10 positioned on a hinge in a working configuration and already adjusted to conform to the size of the hinge assembly 84.

Figure 14:
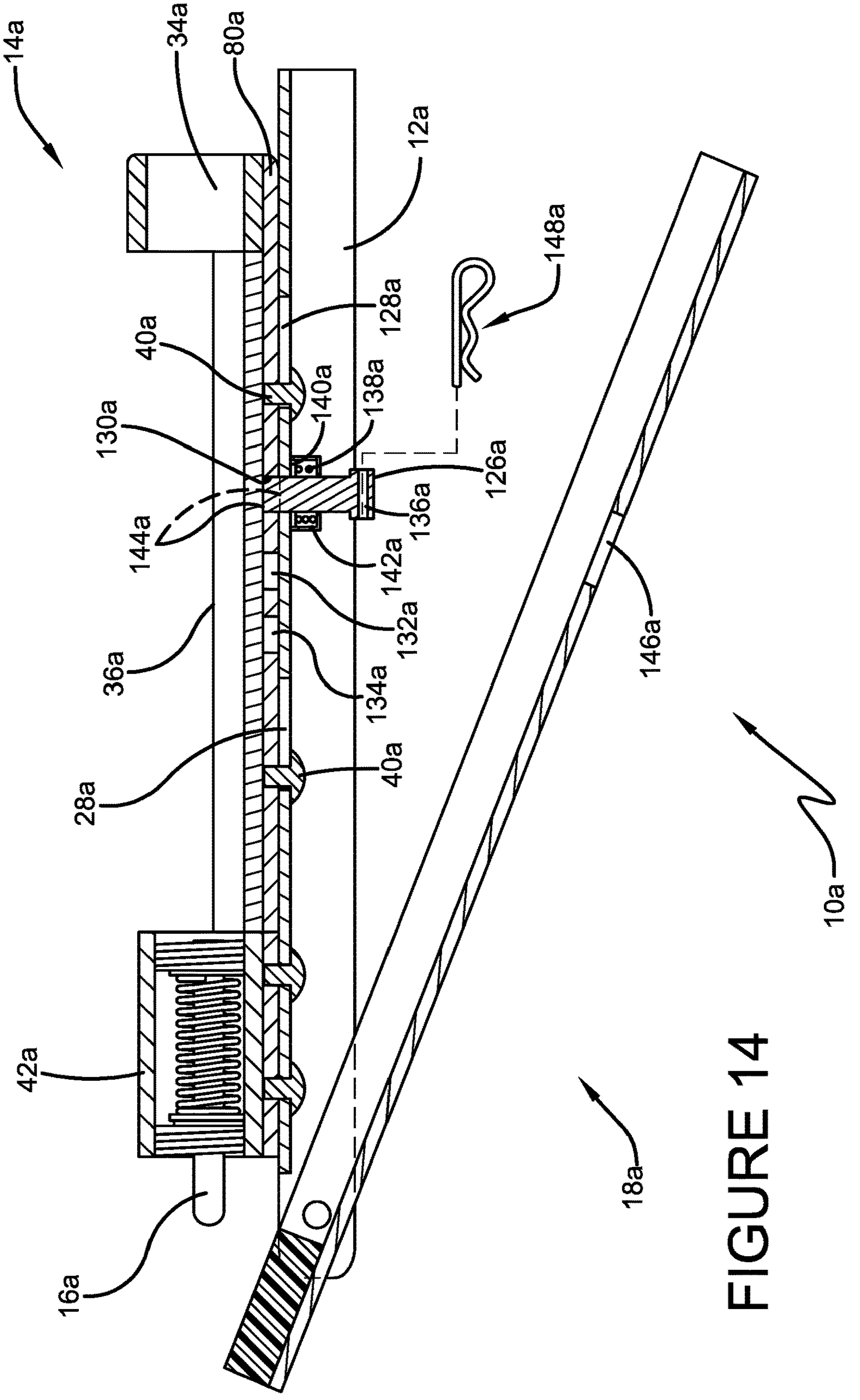
FIG. 14 is a cross-sectional view of a hinge pin extractor according to another exemplary embodiment of the present disclosure.

FIG. 14 is a cross-sectional view of a hinge pin extractor 10*a* according to another exemplary embodiment of the present disclosure. The hinge pin extractor 10*a* can include a base 12*a*, a hinge receiver 14*a*, a plunger 16*a*, and a lever 18*a*. The hinge receiver 14*a* can include a first portion 34*a* and a second portion 36*a*. In this exemplary embodiment, the first portion 34*a* and the second portion 36*a* can be separately formed components. The exemplary hinge receiver 14*a* can also include a plate member 80*a*. The first portion 34*a* and the second portion 36*a* can be fixed to the plate member 80*a*. The plate member 80*a* can be attached to the base 12*a* for sliding movement. By way of example and not limitation, the first portion 34*a* and the second portion 36*a* can be fixed to the plate member 80*a* by welding and then the plate member 80*a* can be attached to the base 12*a* with fasteners 40*a*. The fasteners 40*a* can be received in slots 28*a* and 128*a*.

This embodiment can simplify manufacturing. For example, the portion 36*a* can be formed by cutting a cylindrical tube in half along its longitudinal length (resulting in two portions 36*a* for two devices 10*a*). The portion 34*a* can be formed by cutting desired lengths from a cylindrical tube. The plate member 80*a*, the portion 34*a*, and the portion 36*a* can be held in a fixture and welded together.

FIG. 14 also shows that the hinge pin extractor 10*a* can also include a releasible locking mechanism for selectively preventing sliding movement of the plate member 80*a*. The locking mechanism can include a pin 126*a* mounted to the base 12*a* for rectilinear movement between first and second end limits of travel. The first end limit of travel is shown in solid line and corresponds to the pin 126*a* being received in one of a plurality of apertures 130*a*, 132*a*, 134*a* defined by the plate 80*a*. The second end limit of travel is defined when the pin 126*a* is withdrawn from the plate 80*a*, as will be discussed in greater detail below. The pin 126*a* can also include a lateral aperture 136*a*, as shown in FIG. 14.

The locking mechanism can also include a spring 138*a* biasing the pin to the first end limit of travel. The spring 138*a* can act between a c-clip 140*a* mounted on the pin 126*a* and a cap 142*a* that is fixed to the base 12*a*. The pin 126*a* includes a distal end 144*a*. The position of the distal end 144*a* when the pin 126*a* is at the second end limit of travel is shown in phantom (dash line).

The lever 18*a* includes an aperture 146*a* configured to receive a portion of the pin 126*a* whereby the lateral aperture 136*a* is exposed when the pin 126*a* is received in aperture 146*a* of the lever 18*a*. For example, when the lever 18*a* is folded into the base 12*a* when not being used (as shown in FIG. 8), the end of the pin 126*a* opposite to the distal end 144*a* can protrude out of the aperture 146*a*. The locking mechanism can also include a cotter pin 148*a* received in the lateral aperture 136*a*.

In use, the user can place the hinge receiver 14*a* on a hinge and pull the lever 18*a* to free the hinge receiver 14*a* for adjustment. The hinge receiver 14*a* can be adjusted so that the hinge is captured as closely as possible between the hinge receiver 14*a* and a plunger sleeve 42*a*. The lever 18*a* can then be returned to being folded into the base 12*a*, the cotter pin 148*a* can be removed, and the hinge pin can then be removed.

Figure 15:
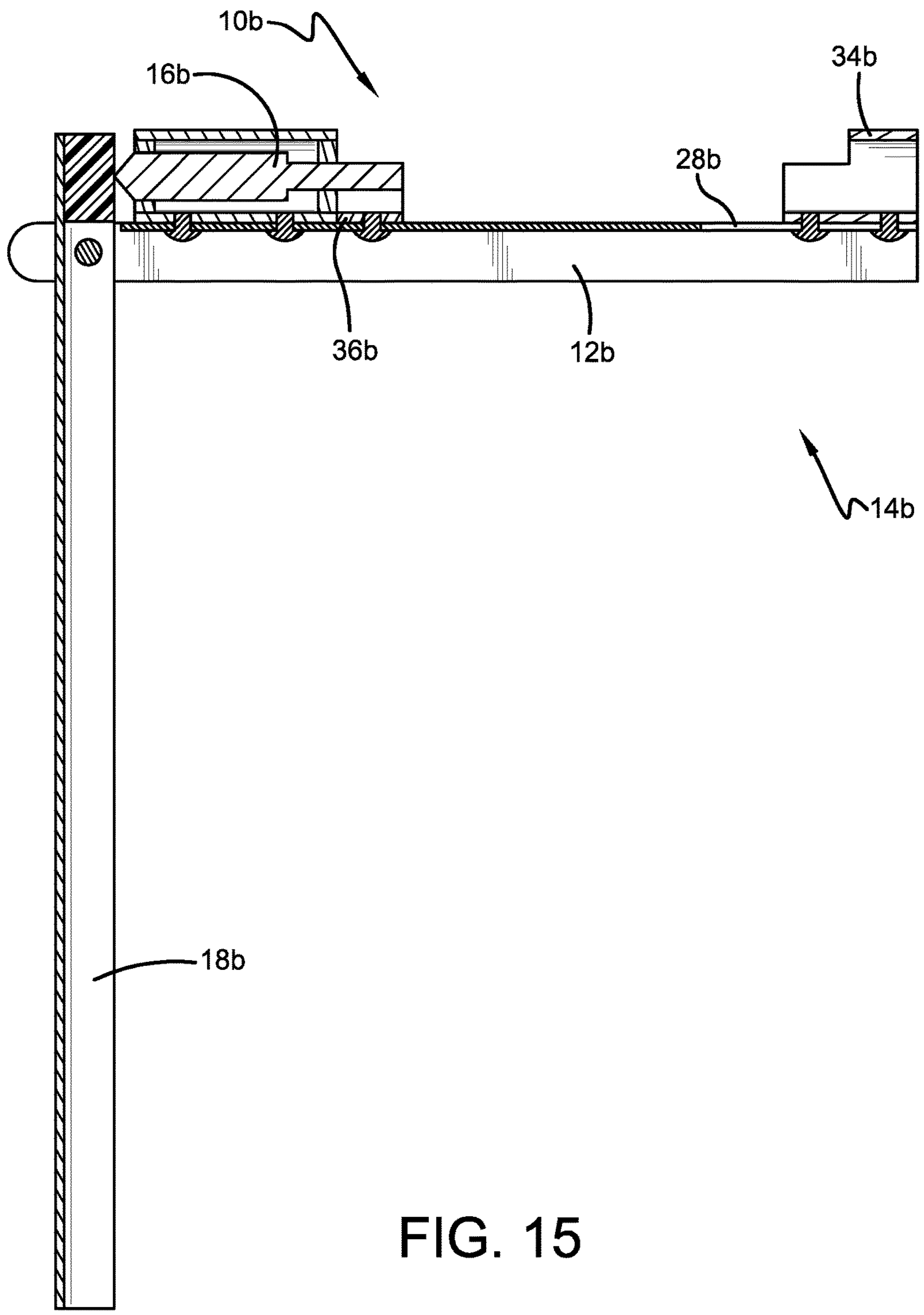
FIG. 15 is a cross-sectional view of a hinge pin extractor according to another exemplary embodiment of the present disclosure.

FIG. 15 is a cross-sectional view of a hinge pin extractor 10*b* according to another exemplary embodiment of the present disclosure. The hinge pin extractor 10*b* can include a base 12*b*, a hinge receiver 14*b*, a plunger 16*b*, and a lever 18*b*. The hinge receiver 14*b* can include a first portion 34*b* and a second portion 36*b*. The portion 34*b* of the hinge receiver 14*b* is interconnected with the base 12*b* through a slot 28*b*. The plunger 16*b* and the portion 36*b* can be interconnected with the base 12*b* with fasteners passing through apertures in the base 12*b* as shown in FIG. 15.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. Further, the "present disclosure" as that term is used in this document is what is claimed in the claims of this document. The right to claim elements and/or subcombinations that are disclosed herein as other present disclosures in other patent documents is hereby unconditionally reserved.

What is claimed is:

1. A hinge pin extractor operable to urge a pin out of engagement with a hinge assembly and comprising:

a base;

a receiver mounted to said base and configured to engage at least one of a first plate, a second plate, and at least one knuckle of the hinge assembly, said receiver sized to allow pass-through of the pin as the pin exits the at least one knuckle;

a plunger mounted to said base for movement along a rectilinear path between a first end limit of travel and a second end limit of travel and configured to urge the pin of the hinge assembly out of engagement with the at least one knuckle during movement from said first end limit of travel to said second end limit of travel;

a lever pivotally engaged with said base and disposed to engage said plunger to transmit motion to said plunger and thereby move said plunger along said rectilinear path;

wherein said lever and said base and said plunger are engaged such that pivoting motion of said lever is transmitted to rectilinear motion of said plunger through at least one fulcrum defined in said base; and wherein said lever and said plunger are further defined as engaging one another in a cam-cam follower arrangement and are not positively interconnected.

2. The hinge pin extractor of claim 1 wherein said lever and said base and said plunger are engaged such that pivoting motion of said lever is transmitted to rectilinear motion of said plunger through a single pivot axis.

3. The hinge pin extractor of claim 1 wherein said lever and said plunger are further defined as engaging one another such that at least a portion of said plunger slides across said lever during the transmission of motion.

4. The hinge pin extractor of claim 3 wherein said lever further comprises:

a bushing having a substantially flat, planar shape, said bushing defining the surface slid across by said at least a portion of said plunger.

5. The hinge pin extractor of claim 1 wherein said receiver includes a downwardly facing surface configured to engage top edges of the first plate and the second plate of the hinge assembly, said downwardly facing surface extending continuously about an arcuate path of at least one hundred and eighty degrees.

6. The hinge pin extractor of claim 5 wherein said receiver is centered on a longitudinal axis and said arcuate path extends about said longitudinal axis.

7. A hinge pin extractor operable to urge a pin out of engagement with a hinge assembly and comprising:

a base;

a receiver mounted to said base and configured to engage at least one of a first plate, a second plate, and at least one knuckle of the hinge assembly, said receiver sized to allow pass-through of the pin as the pin exits the at least one knuckle;

a plunger mounted to said base for movement along a rectilinear path between a first end limit of travel and a second end limit of travel and configured to urge the pin of the hinge assembly out of engagement with the at least one knuckle during movement from said first end limit of travel to said second end limit of travel;

a lever pivotally engaged with said base and disposed to engage said plunger to transmit motion to said plunger and thereby move said plunger along said rectilinear path;

wherein said lever and said base and said plunger are engaged such that pivoting motion of said lever is transmitted to rectilinear motion of said plunger through at least one fulcrum defined in said base; and wherein a distance between said receiver and said first end limit of travel of said plunger is adjustable.

8. A hinge pin extractor operable to urge a pin out of engagement with a hinge assembly and comprising:

a base;

a receiver mounted to said base and configured to engage at least one of a first plate, a second plate, and at least one knuckle of the hinge assembly, said receiver sized to allow pass-through of the pin as the pin exits the at least one knuckle;

a plunger mounted to said base for movement along a rectilinear path between a first end limit of travel and a second end limit of travel and configured to urge the pin of the hinge assembly out of engagement with the at least one knuckle during movement from said first end limit of travel to said second end limit of travel;

a lever pivotally engaged with said base and disposed to engage said plunger to transmit motion to said plunger and thereby move said plunger along said rectilinear path;

wherein said lever and said base and said plunger are engaged such that pivoting motion of said lever is transmitted to rectilinear motion of said plunger through at least one fulcrum defined in said base;

a sleeve mounted to said base and extending between a first end and a second end;

a first end cap having a first aperture and substantially closing said first end of said sleeve; and a second end cap having a second aperture and substantially closing said second end of said sleeve, wherein said plunger is disposed in said sleeve and sized to pass through both of said first aperture and said second aperture.

9. The hinge pin extractor of claim 8 further comprising:

a shoulder fixedly engaged with said plunger and positioned in said sleeve; and a spring operably positioned between said shoulder and one of said first end cap and said second end cap within said sleeve, said spring biasing said plunger to said first end limit of travel.

10. A hinge pin extractor operable to urge a pin out of engagement with a hinge assembly and comprising:

a base;

a receiver mounted to said base and configured to engage at least one of a first plate, a second plate, and at least one knuckle of the hinge assembly, said receiver sized to allow pass-through of the pin as the pin exits the at least one knuckle;

a plunger mounted to said base for movement along a rectilinear path between a first end limit of travel and a second end limit of travel and configured to urge the pin of the hinge assembly out of engagement with the at least one knuckle during movement from said first end limit of travel to said second end limit of travel;

a lever pivotally engaged with said base and disposed to engage said plunger to transmit motion to said plunger and thereby move said plunger along said rectilinear path;

wherein said lever and said base and said plunger are engaged such that pivoting motion of said lever is transmitted to rectilinear motion of said plunger through at least one fulcrum defined in said base; and wherein said receiver is centered on and extends a length along a longitudinal axis, has a ring cross-section along at least a first part of said length in planes perpendicular to said longitudinal axis, and has a c-shaped cross-section along at least a second part of said length in planes perpendicular to said longitudinal axis.

11. The hinge pin extractor of claim 10 wherein said second part of said length is at least as long as said first part of said length.

12. The hinge pin extractor of claim 10 wherein said receiver is mounted to said base at a midpoint of said c-shaped cross-section.

13. The hinge pin extractor of claim 10 wherein said rectilinear movement of said plunger is along said longitudinal axis.

14. The hinge pin extractor of claim 10 wherein said receiver includes a tubular portion configured to surround a head of the pin of the hinge assembly.

15. A hinge pin extractor operable to urge a pin out of engagement with a hinge assembly and comprising:

a base;

a receiver mounted to said base and configured to engage at least one of a first plate, a second plate, and at least one knuckle of the hinge assembly, said receiver sized to allow pass-through of the pin as the pin exits the at least one knuckle;

a plunger mounted to said base for movement along a rectilinear path between a first end limit of travel and a second end limit of travel and configured to urge the pin of the hinge assembly out of engagement with the at least one knuckle during movement from said first end limit of travel to said second end limit of travel;

a lever pivotally engaged with said base and disposed to engage said plunger to transmit motion to said plunger and thereby move said plunger along said rectilinear path;

wherein said lever and said base and said plunger are engaged such that pivoting motion of said lever is transmitted to rectilinear motion of said plunger through at least one fulcrum defined in said base; and wherein said lever extends between a first end proximate to said plunger and a second end spaced from said first end and said plunger, said lever further comprising a notch at said second end configured to partially encircle the pin of the hinge assembly.

16. The hinge pin extractor of claim 15 wherein said base defines a recess sized to receive said lever when said lever is not in use, said notch exposed and configured to partially encircle the pin of the hinge assembly when said lever is received in said recess.

17. A hinge pin extractor operable to urge a pin out of engagement with a hinge assembly and comprising:

a base;

a receiver mounted to said base and configured to engage at least one of a first plate, a second plate, and at least one knuckle of the hinge assembly, said receiver sized to allow pass-through of the pin as the pin exits the at least one knuckle;

a plunger mounted to said base for movement along a rectilinear path between a first end limit of travel and a second end limit of travel and configured to urge the pin of the hinge assembly out of engagement with the at least one knuckle during movement from said first end limit of travel to said second end limit of travel;

a lever pivotally engaged with said base and disposed to engage said plunger to transmit motion to said plunger and thereby move said plunger along said rectilinear path;

wherein said lever and said base and said plunger are engaged such that pivoting motion of said lever is transmitted to rectilinear motion of said plunger through at least one fulcrum defined in said base; and wherein a distance between said receiver and said first end limit of travel of said plunger is adjustable and wherein at least one of said receiver and said plunger is interconnected with said base through at least one slot defined in said base with one or more fasteners passing through said at least one slot, such that said one of said receiver and said plunger is positionable in a plurality of different positions along said slot.

18. The hinge pin extractor of claim 17 wherein said one or more fasteners are tightenable to selectively fix said receiver in any one of said plurality of positions.

19. The hinge pin extractor of claim 17 wherein said at least one slot is further defined as first and second slots and both of said receiver and said plunger are adjustably interconnected with said base, said receiver interconnected with said base through said first slot and said plunger interconnected with said base through said second slot.

20. A hinge pin extractor operable to urge a pin out of engagement with a hinge assembly and comprising:

a base;

a receiver mounted to said base and configured to engage at least one of a first plate, a second plate, and at least one knuckle of the hinge assembly;

a plunger mounted to said base for movement along a rectilinear path between a first end limit of travel and a second end limit of travel and configured to urge the pin of the hinge assembly out of engagement with the at least one knuckle during movement from said first end limit of travel to said second end limit of travel;

a lever pivotally engaged with said base and disposed to engage said plunger to transmit motion to said plunger and thereby move said plunger along said rectilinear path;

wherein said lever and said base and said plunger are engaged such that pivoting motion of said lever is transmitted to rectilinear motion of said plunger through at least one fulcrum defined in said base;

wherein a distance between said receiver and said first end limit of travel of said plunger is adjustable and wherein at least one of said receiver and said plunger is interconnected with said base through at least one slot defined in said base with one or more fasteners passing through said at least one slot, such that said one of said receiver and said plunger is positionable in a plurality of different positions along said slot;

a pin mounted to said base for rectilinear movement between first and second end limits of travel and having a lateral aperture;

a spring biasing said pin to said first end limit of travel; and wherein said lever includes an aperture configured to receive a portion of said pin whereby said lateral aperture is exposed when said pin is received in aperture of said lever.

* * * * *